3,415,863
SILICON-NITROGEN-PHOSPHORUS SYSTEMS
Kazimiera J. L. Paciorek and Reinhold H. Kratzer, Costa
Mesa, Calif., assignors to the United States of America
as represented by the Secretary of the Navy
No Drawing. Filed Feb. 25, 1966, Ser. No. 531,645
3 Claims. (Cl. 260—448.2)

The invention herein described may be manufactured and used by or for the Government of the United States of America for governmental purposes without the payment of any royalties thereon or therefor.

This invention relates to novel thermally stable compounds and the preparation of thermally stable systems containing a silicon-nitrogen-phosphorus backbone represented by the general formula $$-R_2Si-NH-PR_2=N-SiR_2-$$

by the interaction of silicon azides with disubstituted phosphines.

Depending upon the R groups present, these materials comprise thermally stable liquids and solids that can be used as high temperature lubricants and sealants.

It is an object of the invention to provide thermally stable systems containing a silicon-nitrogen-phosphorus backbone.

Another object of the invention is to provide a procedure for the preparation of novel thermally stable silicon-nitrogen-phosphorus systems.

Other objects and many of the attendant advantages of this invention will become readily appreciated as the same becomes better understood by reference to the following detailed description.

The process of the instant invention comprises the interaction of silyl azide or silyl diazide with a disubstituted phosphine. The process can be best represented as follows:

$$R_3SiN_3 + R_2PH \rightarrow R_3Si-NH-PR_2 + N_2$$
$$R_3SiNHPR_2 + R_3SiN_3 \rightarrow R_3Si-NHPR_2=N-SiR_3 + N_2$$
$$2R'R''R'''Sin_3 + R^{IV}R^VPH \rightarrow R'R''R'''Si$$
$$-NH-PR^{IV}R^V=N-SiR'R''R''' + 2N_2$$

The groups R'R" and R''' can be either alkyl or aryl while the groups $R^{IV}$ and $R^V$ can be either alkyl, aryl alkoxy, aryloxy or their perfluorinated analogues.

By employing silyl diazides, as shown below, polymeric materials can be obtained $$nR'R''Si(N_3)_2 + nR^{IV}R^VPH \rightarrow$$
$$(-R'R''Si-NH-PR^{IV}R^V=N-SiR'R''-)_n + 2nN_2$$

To illustrate this invention, a typical preparation of system $(C_6H_5)_3Si-NH-P(C_6H_5)_2=N-Si(C_6H_5)_3$ is described.

In a nitrogen atmosphere $(C_6H_5)_3SiN_3$ (9.04 g., 0.03 mole in ether (90 ml.) was treated with $(C_6H_5)_2PH$ (5.5 g., 0.03 mole) in ether (10 ml.), the solution was then refluxed overnight. The next day ether was removed in vacuo and the residue was heated at 100° for 10 days. On cooling, a solid mass was obtained, which on crystallization from heptane gave 4.67 g. (45% yield) of $(C_6H_5)_3Si-NH-P(C_6H_5)_2=NSi(C_6H_5)_3$ M.P. 156–157°.

Analysis.—Calcd. for $C_{48}H_{41}N_2Si_2P$: C, 78.65; H, 5.64; P, 4.23; N, 3.55; Si, 7.41; mol. wt. 733.03. Found: C, 78.26; H, 5.72; P, 4.25; N, 3.55; Si, 7.41; mol. wt. 670 (in benzene using Mechrolab osmometer).

(The compound $(C_6H_5)_3SiNHP(C_6H_5)_2=NSi(C_6H_5)_3$ was heated in atmosphere above its melting point. No decomposition occurred.)

Concentration of the mother liquors gave 2.14 g. (19% yield) of the precursor $(C_6H_5)_3Si-NH-P(C_6H_5)_2$ M.P. 148–149° which was purified by sublimation and crystallization from heptane.

Analysis.—Calcd. for $C_{30}H_{26}NPSi$: C, 78.40; H, 5.70; N, 3.05; P, 6.74; Si, 6.11; mol. wt. 459.61. Found: C, 78.62; H, 5.83; N, 2.92; P, 6.63; Si, 5.75; mol. wt. 455 (in benzene using Mechrolab osmometer).

Obviously many modifications and variations of the present invention are possible in the light of the above teachings. It is therefore to be understood that within the scope of the appended claims the invention may be practiced otherwise than as specifically described.

What is claimed is:
1. The compound

$$(C_6H_5)_3Si-NH-P(C_6H_5)_2=N-Si(C_6H_5)_3$$

2. The compound $(C_6H_5)_3Si-NH-P(C_6H_5)_2$.
3. The process for preparing the compounds $$(C_6H_5)_3Si-NH-P(C_6H_5)_2=N-Si(C_6H_5)_3$$

and $(C_6H_5)_3Si-NH-P(C_6H_5)_2$ comprising:
(a) reacting equal molar quantities of $(C_6H_5)_3SiN_3$ and $(C_6H_5)_2PH$ in refluxing ether in a nitrogen atmosphere for approximately 18 hours,
(b) removing the ether in vacuo and further heating the solid residue at 100° C. for several days,
(c) cooling the residue and crystallizing reaction mixture from heptane to yield $$(C_6H_5)_3Si-NH-P(C_6H_5)_2=N-Si(C_6H_5)_3$$

having a melting point of 156–157° C.
(d) concentrating the remaining heptane solution to yield $(C_6H_5)_3Si-NH-P(C_6H_5)_2$ which is purified by sublimation and recrystallization from heptane to yield $(C_6H_5)_3Si-NH-P(C_6H_5)_2$ having a melting point of 148–149° C.

References Cited

UNITED STATES PATENTS

| | | | |
|---|---|---|---|
| 3,070,582 | 12/1962 | Gutweiler et al. | 260—80 XR |
| 3,112,331 | 11/1963 | Washburn et al. | 260—429 XR |
| 3,113,139 | 12/1963 | Birum et al. | 260—346.1 XR |
| 3,159,668 | 12/1964 | Rochow | 260—448.2 |
| 3,164,622 | 1/1965 | Newlands | 260—448.2 |
| 3,188,294 | 6/1965 | Maier | 260—2 XR |
| 3,297,751 | 1/1967 | Paciorek et al. | 260—551 XR |
| 3,341,478 | 9/1967 | Washburn et al. | 260—2 XR |

TOBIAS E. LEVOW, *Primary Examiner.*
J. P. PODGORSKI, *Assistant Examiner.*

U.S. Cl. X.R.
252—49.9; 106—287